United States Patent
Martini

(10) Patent No.: US 10,394,259 B2
(45) Date of Patent: Aug. 27, 2019

(54) CURRENT LIMITING ELECTRONIC FUSE CIRCUIT

(71) Applicant: STMicroelectronics S.r.l., Agrate Brianza (IT)

(72) Inventor: Marco Martini, Acireale (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 59 days.

(21) Appl. No.: 14/838,706

(22) Filed: Aug. 28, 2015

(65) Prior Publication Data

US 2017/0060152 A1   Mar. 2, 2017

(51) Int. Cl.
  *G05F 1/46*   (2006.01)

(52) U.S. Cl.
  CPC ..................... *G05F 1/46* (2013.01)

(58) Field of Classification Search
  CPC .......... G05F 1/573; G05F 1/571; G05F 1/569; G05F 1/5735; G05F 1/565; G05F 1/575; G05F 1/567; G05F 1/648; H02M 3/156
  USPC .................. 323/223, 277, 276, 278, 279
  See application file for complete search history.

(56) References Cited

U.S. PATENT DOCUMENTS

| | | | |
|---|---|---|---|
| 5,272,392 A | 12/1993 | Wong et al. | |
| 5,764,041 A * | 6/1998 | Pulvirenti et al. | G05F 1/56 323/282 |
| 6,507,227 B2 | 1/2003 | Genova et al. | |
| 6,603,358 B2 | 8/2003 | Shearon et al. | |
| 7,199,606 B2 | 4/2007 | Tanabe | |
| 7,710,701 B1 | 5/2010 | Mei et al. | |
| 8,547,079 B2 * | 10/2013 | Socheat | G05F 1/575 323/275 |
| 8,680,828 B2 * | 3/2014 | Heng | G05F 1/575 323/275 |
| 2004/0004470 A1 * | 1/2004 | Yoshida | H02M 3/1563 323/284 |
| 2005/0013079 A1 | 1/2005 | Mitsuda | |
| 2010/0007328 A1 * | 1/2010 | Sander | H03K 17/0822 324/76.11 |
| 2011/0260782 A1 * | 10/2011 | Wagner | G05F 1/565 327/538 |
| 2012/0038332 A1 * | 2/2012 | Lin | G05F 1/575 323/277 |
| 2015/0280416 A1 * | 10/2015 | Kreuter | H01H 83/00 361/55 |
| 2017/0019100 A1 * | 1/2017 | Kang | H03K 17/6871 |

\* cited by examiner

*Primary Examiner* — Jue Zhang
*Assistant Examiner* — Lorena Bruner
(74) *Attorney, Agent, or Firm* — Crowe & Dunlevy

(57) ABSTRACT

A power transistor generates an output current and a sense transistor generates a proportional sense current. A differential amplifier generates a gate voltage applied to the power and sense transistors in response to first and second input signals. A comparator circuit compares the gate voltage to a switching reference to detect whether the power and sense transistors are operating in a triode mode of operation or in a saturation mode of operation. At least one of the first and second input signals is modified in response to the detection made by the comparator circuit. In one instance, different reference voltages are applied to an input of the amplifier depending on the detected mode of operation. In another instance, different resistances are used to convert the sense current to a voltage for application to an input of the amplifier in response to the detected mode of operation.

15 Claims, 4 Drawing Sheets

CURRENT LIMITING ELECTRONIC FUSE CIRCUIT

TECHNICAL FIELD

The present invention relates to a circuit configured to limit output current delivered to a load and, in particular, to a circuit operable to sense an overcurrent condition and respond thereto by continuing to supply the load with a limited current.

BACKGROUND

It is known in the art to employ a fuse circuit that when tripped in an overcurrent condition will terminate supply of current to the load. It is a disadvantage of such a fuse circuit that the protection mode terminates current delivery. Further advances in fuse circuit design provide for an electronic fuse circuit (sometimes referred to in the art as an "e-fuse" circuit) that senses an overcurrent condition and responds thereto by continuing to deliver some current to the load, albeit at a reduced level. Such e-fuse circuits typically have a trip current (Itrip) threshold that must be exceeded before the overcurrent condition is detected. In response to overcurrent detection, the e-fuse circuit will cause the output current level to be reduced to a limited current (Ilim). The gap between the trip current Itrip the limited current Ilim can be undesirably wide. A need accordingly exists in the art for an e-fuse circuit configured for operation with closely related values for Itrip and Ilim.

SUMMARY

In an embodiment, a circuit comprises: a power transistor configured to deliver an output current to a load; a sense transistor configured to generate a sense current proportional to the output current; a differential amplifier circuit having an output configured to generate a drive signal coupled to control terminals of the power transistor and the sense transistor in response to first and second input signals; a comparator circuit configured to compare the drive signal to a switching reference and generate a switch control signal; and a switchable circuit configured to change at least one the first and second signals in response to the switch control signal.

In an embodiment, a circuit comprises: a MOSFET power transistor configured to deliver an output current to a load; a MOSFET sense transistor configured to generate a sense current proportional to the output current; a differential amplifier circuit having an output configured to generate a gate voltage of the power transistor and the sense transistor in response to first and second input signals to control operation of the MOSFET power and sense transistors in a triode mode of operation and a saturation mode of operation; a comparator circuit configured to compare the gate voltage to a switching reference to detect whether the MOSFET power and sense transistors are in the triode mode of operation and saturation mode of operation; and a switchable resistance circuit through which the sense current passes to generate a sense voltage applied to an input of the differential amplifier, said switchable resistance circuit having a first resistance when the comparator detects that the MOSFET power and sense transistors are in the triode mode of operation and having a second resistance when the comparator detects that the MOSFET power and sense transistors are in the saturation mode of operation.

In an embodiment, a circuit comprises: a MOSFET power transistor configured to deliver an output current to a load; a MOSFET sense transistor configured to generate a sense current proportional to the output current; a differential amplifier circuit having an output configured to generate a gate voltage of the power transistor and the sense transistor in response to first and second input signals to control operation of the MOSFET power and sense transistors in a triode mode of operation and a saturation mode of operation; a comparator circuit configured to compare the gate voltage to a switching reference to detect whether the MOSFET power and sense transistors are in the triode mode of operation and saturation mode of operation; and a variable voltage generator circuit configured to generate a reference voltage applied to an input of the differential amplifier, said variable voltage generator circuit outputting a first reference voltage value when the comparator detects that the MOSFET power and sense transistors are in the triode mode of operation and outputting a second reference voltage value when the comparator detects that the MOSFET power and sense transistors are in the saturation mode of operation.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
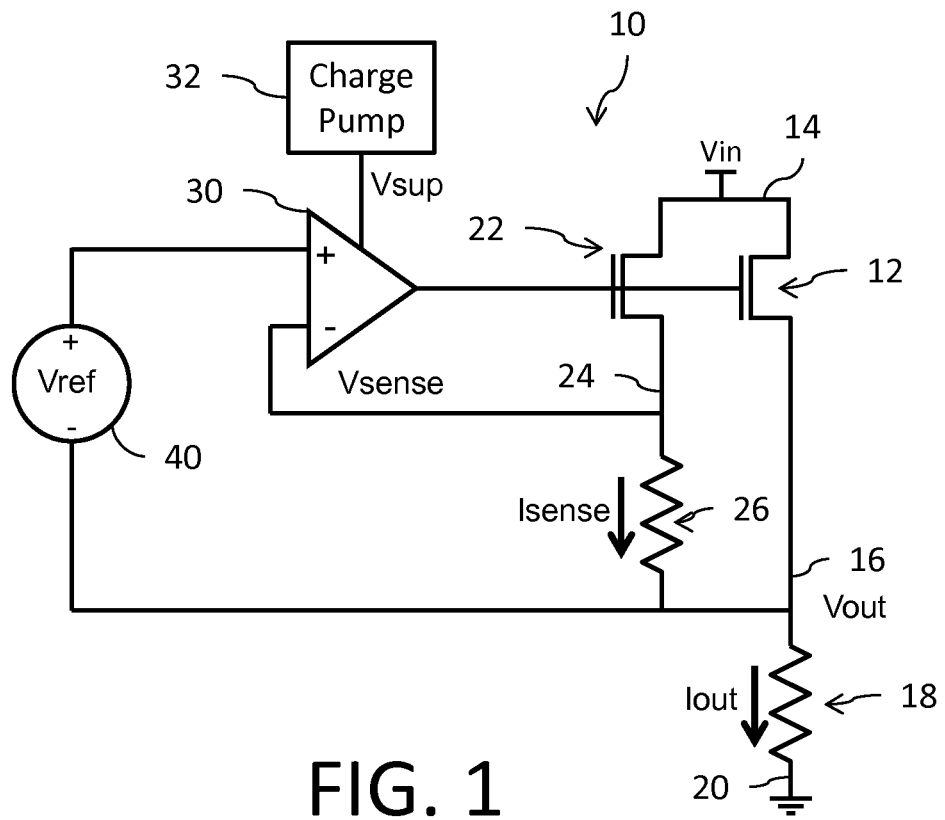
FIG. 1 is a circuit diagram for an embodiment of an e-fuse circuit.

Reference is now made to FIG. 1 showing a circuit diagram for an embodiment of an e-fuse circuit 10. The circuit 10 includes an n-channel power MOSFET device 12 having a drain terminal coupled to an input supply node 14 (Vin) and a source terminal coupled to an output node 16 (Vout). A load 18 (illustrated as a resistive load, without any limitation) is coupled between the output node 16 and a ground reference node 20. An n-channel sense MOSFET device 22 has its drain terminal coupled to the input supply node 14 (Vin) and a source terminal coupled to a sense node 24 (Vsense). A sense resistor 26 is coupled between the sense node 24 and the output node 16. The power MOSFET device 12 and sense MOSFET device 22 have different sizes. The size ratio between the two devices is given by K:1, with the power MOSFET device 12 being K times larger than the sense MOSFET device 22. In an embodiment, the value of K may equal, for example, 2000-5000. The gate terminals of the power MOSFET device 12 and sense MOSFET device 22 are connected together and to the output terminal of a differential amplifier circuit 30 to receive a drive signal. A charge pump circuit 32 generates a supply voltage (Vsup) to power the differential amplifier circuit 30 (wherein Vsup>Vin; for example, Vsup=Vin+5V, where Vin=12V). An inverting input of the differential amplifier circuit 30 is coupled to the sense node 24 to receive the voltage Vsense. A non-inverting input of the differential amplifier circuit 30 is coupled to receive a reference voltage (Vref) generated by a reference voltage generator circuit 40 that is coupled between the non-inverting input and the output node 16.

An output current Iout is delivered by the power MOSFET device 12 to the load 18. The sense MOSFET device 22 generates a current Isense that is K times smaller than the current Iout. As the load 18 demands more current, thus increasing the output current Iout, the current Isense correspondingly increases. This causes an increase in the sense voltage Vsense. While the sense voltage Vsense is less than the reference voltage Vref, the differential amplifier circuit 30 drives the power MOSFET device 12 and sense MOSFET device 22 in the triode region of operation. In this condition, the MOSFETs can be replaced, respectively, in an equivalent circuit representation by resistors having resistance values of Ron and K*Ron, respectively. The ratio of the output current Iout to the sense current Isense is:

$$Iout/Isense = K+(R26/Ron) = K1,$$

Wherein R26 is the resistance of the sense resistor 26, and Ron is the on-resistance of the power MOSFET device 12.

If the output current Iout increases in response to the demands of the load 18, the sense voltage Vsense will increase in response to the corresponding increase of the current Isense. When the sense voltage Vsense equals the reference voltage Vref, the trip point for the current limiting operation is reached. The differential amplifier circuit 30 now drives the power MOSFET device 12 and sense MOSFET device 22 in the saturation region of operation. In this condition, the MOSFETs can each be replaced in an equivalent circuit representation by a current source having an impedance (Zout) much larger than R26. So, $$Zout*Iout = Isense(K*Zout+R26).$$

If Zout>>R26, then the ratio of the output current Iout to the sense current Isense is:

$$Iout/Isense = K2 \text{(which is approximately equal to } K\text{)}.$$

It will be noted that K1 is greater than K2. This difference between K1 and K2 has an effect on the output currents at the trip point and at the limit point of the circuit 10. The current at the trip point (Itrip) is:

$$Itrip = K1(Vref/R26) = K(Vref/R26)+(Vref/Ron).$$

Conversely, the current at the limit point is:

$$Ilim = K2(Vref/R26) = K(Vref/R26).$$

Figure 2:
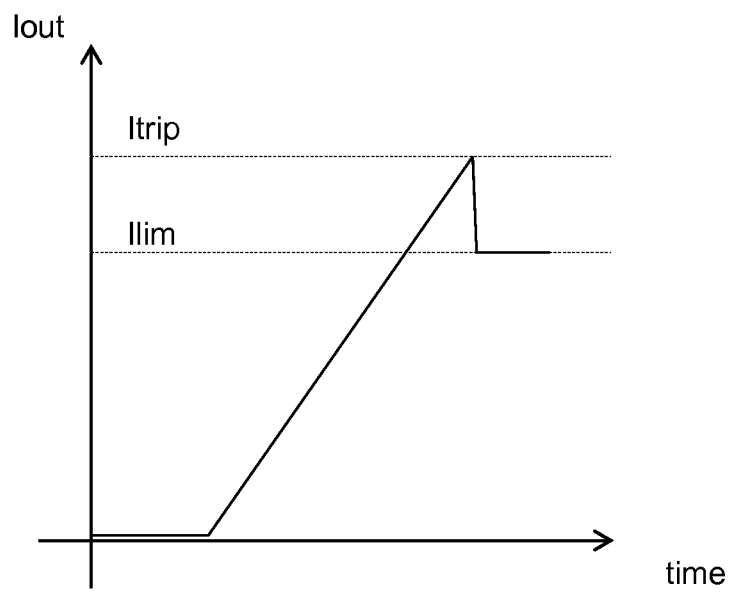
FIG. 2 illustrates operation of the circuit of FIG. 1.

The effect of this change in operating behavior of the power MOSFET device 12 and sense MOSFET device 22 when the overcurrent trip point is reached is shown in FIG. 2. As the current required by the load 18 increases to exceed the current trip Itrip, the power MOSFET device 12 and sense MOSFET device 22 enter the saturation mode and the output current Iout is limited to the current limit Ilim that is lower than Itrip. The reference voltage Vref is typically fixed in the circuit (for example, using a bandgap reference voltage generator), so the setting of the trip point is typically effectuated by varying the resistance R26 of the sense resistor 26 (through trimming or provision as an externally connected component).

It is desirable to make Ilim and Itrip as close as possible to each other for at least the following reasons: a) the operation of the circuit permits an output current in excess of Ilim prior to the trip point; and b) if working with a desired load current (Iload) in the range Ilim<Iload<Itrip, the circuit will respond to a current spike exceeding Itrip by limiting current Ilim to a value that is smaller than the desired load current.

Figure 3:
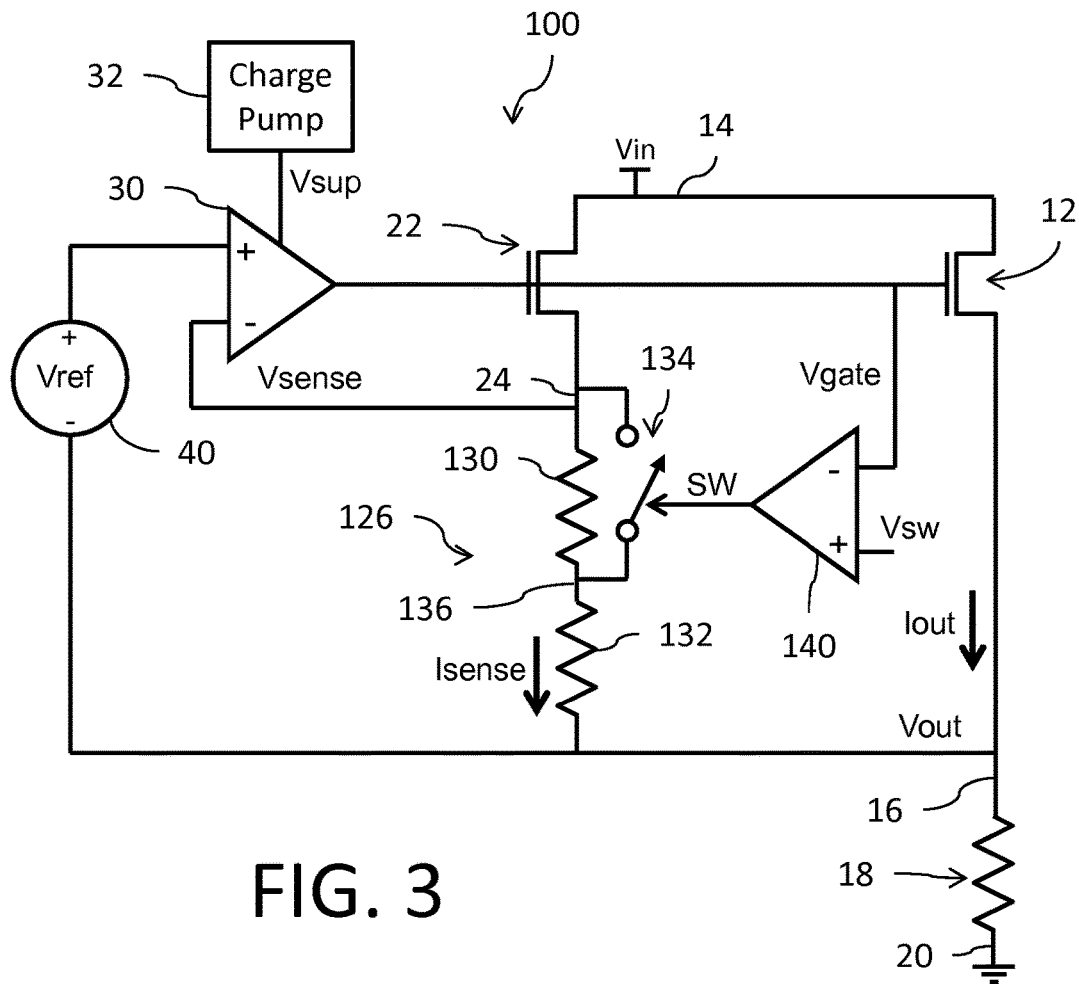
FIG. 3 is a circuit diagram for an embodiment of an e-fuse circuit.

Reference is now made to FIG. 3 showing is a circuit diagram for an embodiment of an e-fuse circuit 100. Like reference numbers refer to like or similar parts, and will not be described again. See, the description above of circuit 10 and FIG. 1.

The circuit 100 differs from the circuit 10 (FIG. 1) in two key aspects.

First, the sense resistor 26 in the circuit 10 of FIG. 1 has been replaced with a switchable sense resistance circuit 126. The switchable sense resistance circuit 126 comprises a first resistor 130 and a second resistor 132 connected in series with each other between the sense node 24 and the output node 16. The switchable sense resistance circuit 126 further comprises a switch circuit 134 having a first terminal connected to the sense node 24 and a second terminal connected to node 136 at the series connected point for resistors 130 and 132. Actuation of the switch circuit 134 is controlled by a switch signal (SW).

Second, the circuit 100 further includes a comparator circuit 140. The comparator circuit 140 has an inverting input coupled to the output of the differential amplifier circuit 30, and is thus configured to sense the voltage (Vgate) at the gates of the power MOSFET device 12 and sense MOSFET device 22. The comparator circuit 140 further includes a non-inverting input coupled to receive a fixed switch voltage (Vsw). The comparator circuit 140 functions to compare the voltage Vgate of the drive signal to the voltage Vsw and generate the switch control signal SW in response to that comparison. The level of the voltage Vsw is set relative to detect a drop in the gate voltage that occurs when the power MOSFET device 12 and sense MOSFET device 22 change from operating in the triode mode of operation to instead operating in the saturation mode of operation. The comparator circuit 140 is preferably a comparator with hysteresis to avoid oscillations with respect to the switching of the switch control signal SW.

When the gate voltage Vgate is greater than Vsw, the switch control signal SW is logic low and the switch circuit 134 is open, with the resistance (Rt) of the switchable sense resistance circuit 126 equal to the sum of the resistances of resistors 130 and 132. Conversely, when the gate voltage Vgate is less than Vsw, the switch control signal SW is logic high and the switch circuit 134 is closed, with the resistance (Rs) of the switchable sense resistance circuit 126 instead equal to the resistance of resistor 132. In this operation, Rs<Rt.

Figure 4:
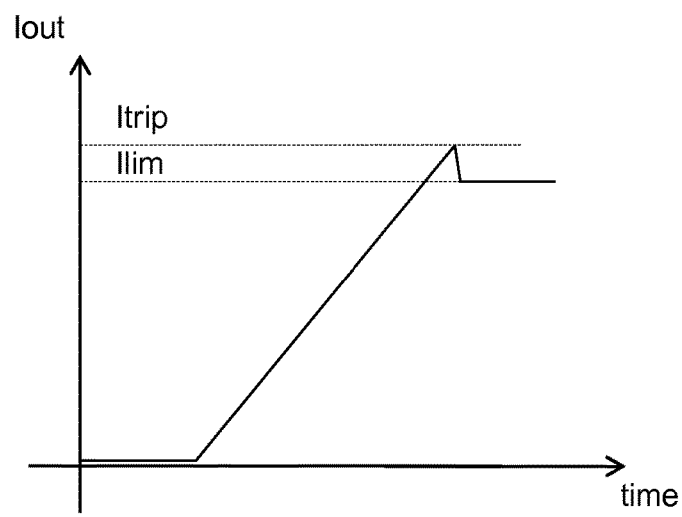
FIG. 4 illustrates operation of the circuit of FIG. 3.

Operation of the circuit 100 is similar to the operation of the circuit 10 except that the currents Ilim and Itrip are closer to each other as shown in FIG. 4 due to the operation of the switchable sense resistance circuit 126. The current at the trip point (Itrip) is:

$$Itrip = K1(Vref/(R130+R132)) = K(Vref/(R130+R132)) + (Vref/Ron).$$

Conversely, the current at the limit point is:

$$Ilim = K2(Vref/R132) = K(Vref/R132).$$

Figure 5:
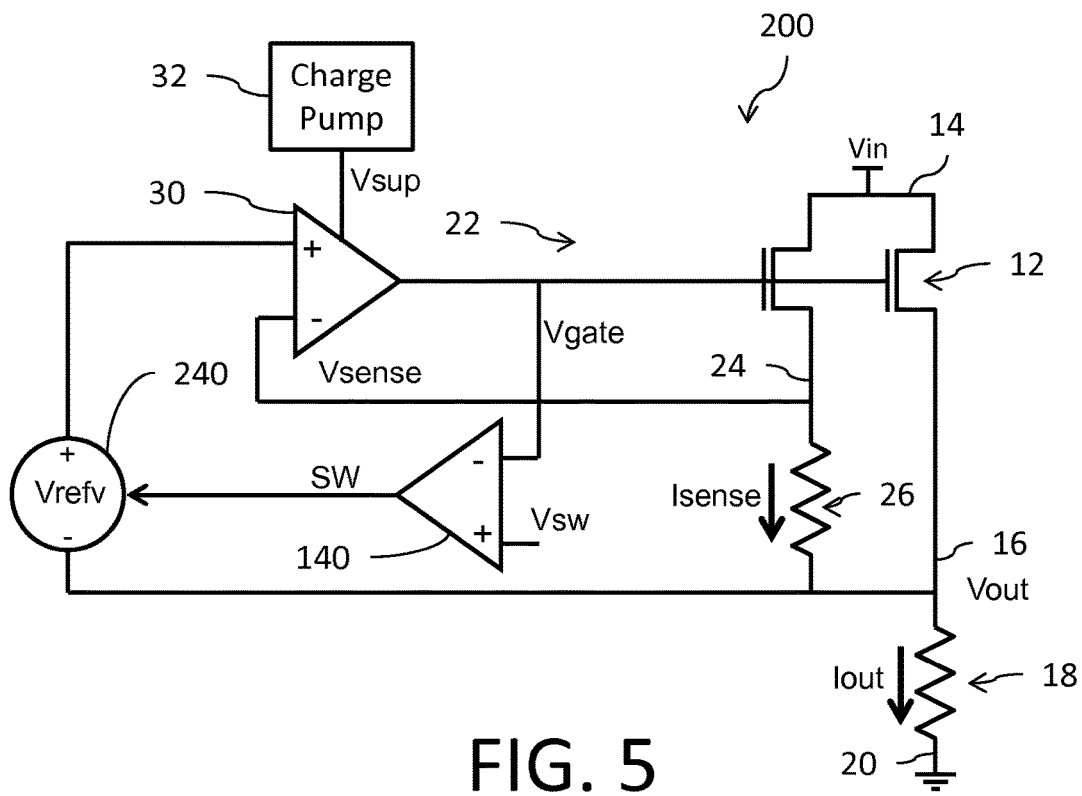
FIG. 5 is a circuit diagram for an embodiment of an e-fuse circuit.

Reference is now made to FIG. 5 showing is a circuit diagram for an embodiment of an e-fuse circuit 200. Like reference numbers refer to like or similar parts, and will not be described again. See, the description above of circuit 10 and FIG. 1.

The circuit 200 differs from the circuit 10 (FIG. 1) in two key aspects.

First, the reference voltage generator circuit 40 in the circuit 10 of FIG. 1 has been replaced with a variable reference voltage generator circuit 240. The variable reference voltage generator circuit 240 operates in response to a switch signal (SW) to selectively output a variable reference voltage for application to the non-inverting input of the differential amplifier circuit 30.

Second, the circuit 100 further includes a comparator circuit 140. The comparator circuit 140 has an inverting input coupled to the output of the differential amplifier circuit 30, and is thus configured to sense the voltage (Vgate) at the gates of the power MOSFET device 12 and sense MOSFET device 22. The comparator circuit 140 further includes a non-inverting input coupled to receive a fixed switch voltage (Vsw). The comparator circuit 140 functions to compare the voltage Vgate of the drive signal to the voltage Vsw and generate the switch control signal SW in response to that comparison. The level of the voltage Vsw is set relative to detect a drop in the gate voltage that occurs when the power MOSFET device 12 and sense MOSFET device 22 change from operating in the triode mode of operation to instead operating in the saturation mode of operation. The comparator circuit 140 is preferably a comparator with hysteresis to avoid oscillations with respect to the switching of the switch control signal SW.

When the gate voltage Vgate is greater than Vsw, the switch control signal SW is logic low and the variable reference voltage generator circuit 240 outputs a first voltage (Vref1). Conversely, when the gate voltage Vgate is less than Vsw, the switch control signal SW is logic high and the variable reference voltage generator circuit 240 outputs a second voltage (Vref2). In this operation, Vref1<Vref2.

Figure 6:
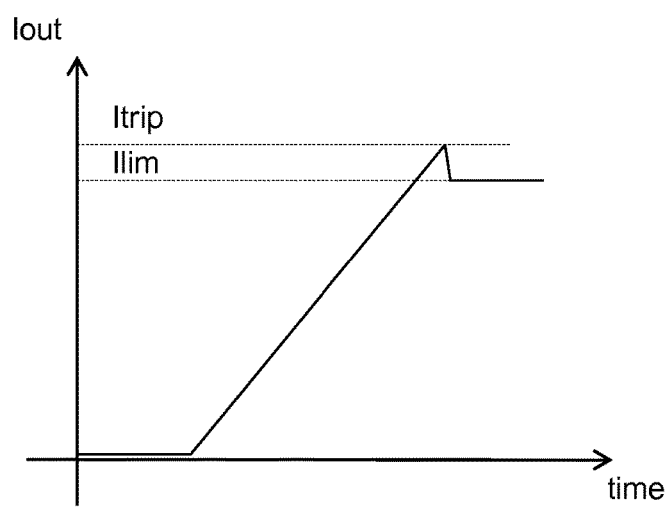
FIG. 6 illustrates operation of the circuit of FIG. 5.

Operation of the circuit 200 is similar to the operation of the circuit 10 except that the currents Ilim and Itrip are closer to each other as shown in FIG. 6 due to the operation of the variable reference voltage generator circuit 240. The current at the trip point (Itrip) is:

$$Itrip=K1(Vref1/(R26))=K(Vref1/(R26))+(Vref1/Ron).$$

Conversely, the current at the limit point is:

$$Ilim=K2(Vref2/R26)=K(Vref2/R26)$$

Figure 7:
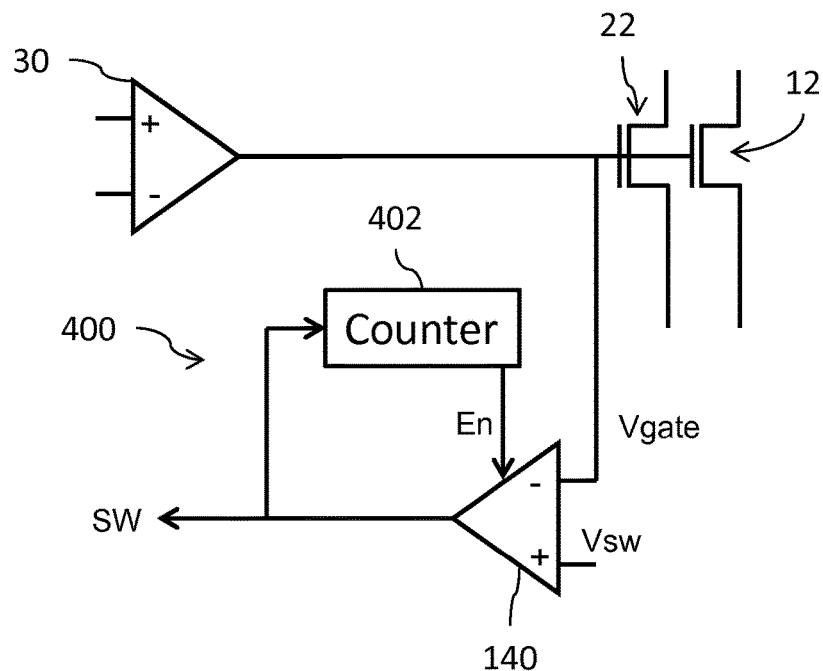
FIG. 7 is a circuit diagram for an enable circuit used in connection with either of the circuits of FIGS. 3 and 5.
Figure 8:
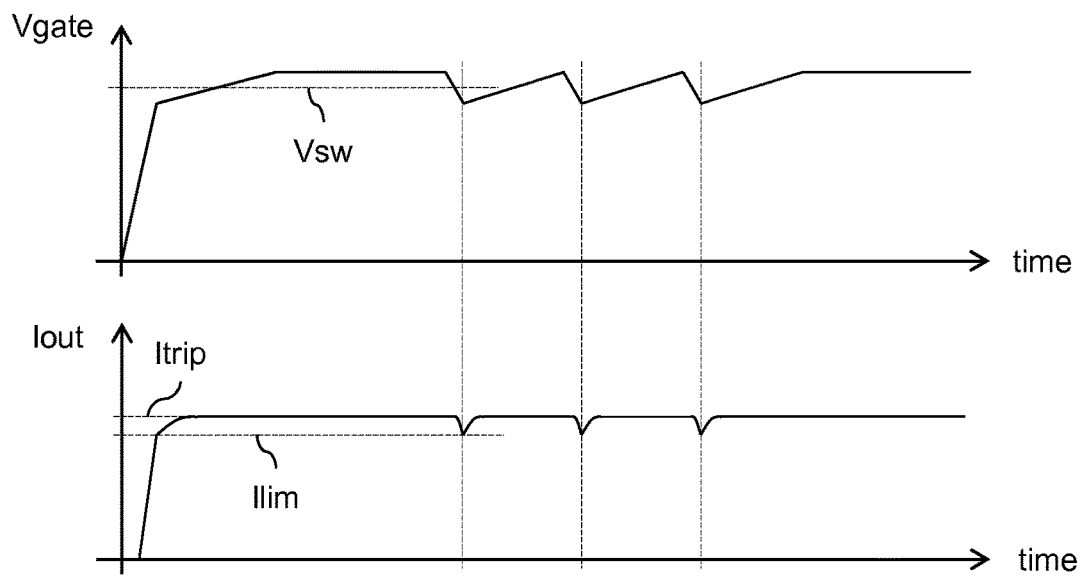
FIG. 8 illustrates operation of the enable circuit with respect to the e-fuse circuits of FIGS. 3 and 5.

There is a possible concern with the operation of circuits 100 and 200 that in setting the relationship between Ilim and Itrip that the power MOSFET device 12 and sense MOSFET device 22 could oscillate back and forth between operating in the triode mode of operation and operating in the saturation mode of operation. This oscillation could present an issue in some circuit applications. To address this concern, FIG. 7 shows an enable circuit 400 coupled to the comparator circuit 140 (or either circuit 100 or 200). The enable circuit 400 includes a counter circuit 402 having an input coupled to receive the switch control signal SW. The counter circuit 402 responds to an edge of the switch control signal SW to increment a count value stored by the counter circuit 402. As long as the count value is less than a count threshold, the enable circuit 400 asserts an enable signal (EN) in a logic state to enable operation of the comparator circuit 140. When the incremented count value meets or exceeds the count value, the enable signal (EN) generated by the enable circuit 400 is de-asserted and operation of the comparator circuit 140 is disabled. FIG. 8 illustrates operation of either of the circuits 100 or 200 with the enable circuit 400 and a count threshold equal to three.

The foregoing description has been provided by way of exemplary and non-limiting examples of a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
   a power transistor configured to deliver an output current to a load;
   a sense transistor configured to generate a sense current proportional to the output current;
   a differential amplifier circuit having an output configured to generate a drive voltage applied to control terminals of the power transistor and the sense transistor in response to a difference between a first input signal and a second input signal;
   a comparator circuit configured to compare the drive voltage to a switching reference voltage and generate a switch control logic signal; and
   a switchable circuit configured to change the first input signal in response to the switch control logic signal, said switchable circuit comprising a switchable resistance circuit connected in series with the sense transistor to receive the sense current and generate a voltage as said first input signal in response to the sense current, said switchable resistance circuit having a first resistance in response to a first logic state of the switch control logic signal and a second resistance in response to a second logic state of the switch control logic signal.

2. The circuit of claim 1, wherein the power transistor and the sense transistor are MOSFET devices, and wherein the drive voltage is a gate voltage, said comparator circuit configured to compare the gate voltage to the switching reference voltage in order to detect transition of the power transistor and the sense transistor from a triode region of operation to a saturation region of operation.

3. The circuit of claim 2, wherein the first resistance is selected to receive the sense current when the power transistor and the sense transistor are in the triode region of operation, and wherein the second resistance is selected to receive the sense current when the power transistor and the sense transistor are in the saturation region of operation.

4. The circuit of claim 1, further comprising an enable circuit configured to count logic transitions of the switch control logic signal and generate an enable signal for application to control operation of the comparator circuit in response to a comparison of the counted logic transitions to a count threshold.

5. The circuit of claim 1, wherein the second input signal is a reference voltage.

6. A circuit, comprising:
   a MOSFET power transistor configured to deliver an output current to a load;
   a MOSFET sense transistor configured to generate a sense current proportional to the output current;
   a differential amplifier circuit having an output configured to generate a gate voltage applied to gate terminals of the power transistor and the sense transistor in response to a first input signal and a second input signal to control operation of the MOSFET power and sense transistors in a triode mode of operation and a saturation mode of operation;
   a comparator circuit configured to compare the gate voltage to a switching reference voltage to detect whether the MOSFET power and sense transistors are in the triode mode of operation and saturation mode of operation and generate a logic signal indicative of the mode of operation; and a switchable resistance circuit through which the sense current passes to generate a sense voltage applied as said first input signal to the differential amplifier, said switchable resistance circuit having a first resistance set by a first logic state of the logic signal when the comparator detects that the MOSFET power and sense transistors are in the triode mode of operation and having a second resistance set by a second logic state of the logic signal when the comparator detects that the MOSFET power and sense transistors are in the saturation mode of operation.

7. The circuit of claim 6, further comprising an enable circuit configured to count transitions of the switch control signal and generate an enable signal for application to control operation of the comparator circuit in response to a comparison of the counted transitions to a count threshold.

8. The circuit of claim 6, wherein the second input signal is a reference voltage.

9. A circuit, comprising:
a power transistor having a gate terminal that receives a transistor gate drive voltage and delivers an output current to a load in response thereto;
a sense transistor configured to receive said transistor gate drive voltage generate a sense current proportional to the output current in response thereto;
a differential amplifier circuit having an output configured to generate said transistor gate drive signal in response to a first input signal and a second input signal;
a comparator circuit configured to compare the transistor gate drive voltage to a switching reference voltage and generate a switch control signal; and
a switchable circuit configured to change the first input signal in response to the switch control signal, said switchable circuit comprising a switchable resistance circuit configured to receive the sense current and generate a voltage as said first input signal in response to the sense current, said switchable resistance circuit having a first resistance in response to a first logic state of the switch control signal and a second resistance in response to a second logic state of the switch control signal .

10. The circuit of claim 9, wherein the comparator circuit is configured to compare the transistor gate drive voltage to the switching reference voltage in order to detect transition of the power transistor and the sense transistor from a triode region of operation to a saturation region of operation.

11. The circuit of claim 10, wherein the first resistance is selected when the power transistor and the sense transistor are in the triode region of operation, and wherein the second resistance is selected when the power transistor and the sense transistor are in the saturation region of operation.

12. The circuit of claim 9, further comprising an enable circuit configured to count transitions of the switch control signal and generate an enable signal for application to control operation of the comparator circuit in response to a comparison of the counted transitions to a count threshold.

13. The circuit of claim 9, wherein the second input signal is a reference voltage.

14. A circuit, comprising:
a power transistor configured to deliver an output current to a load;
a sense transistor configured to generate a sense current proportional to the output current;
a differential amplifier circuit having an output configured to generate a drive voltage applied to control terminals of the power transistor and the sense transistor in response to a difference between a first input signal and a second input signal;
a comparator circuit configured to compare the drive voltage to a switching reference voltage and generate a switch control logic signal;
a switchable circuit configured to change at least one of the first input signal and second input signal in response to the switch control logic signal; and
an enable circuit configured to count logic transitions of the switch control logic signal and generate an enable signal for application to control operation of the comparator circuit in response to a comparison of the counted logic transitions to a count threshold.

15. A circuit, comprising:
a power transistor having a gate terminal that receives a transistor gate drive voltage and delivers an output current to a load in response thereto;
a sense transistor configured to receive said transistor gate drive voltage generate a sense current proportional to the output current in response thereto;
a differential amplifier circuit having an output configured to generate said transistor gate drive signal in response to a first input signal and a second input signal;
a comparator circuit configured to compare the transistor gate drive voltage to a switching reference voltage and generate a switch control signal;
a switchable circuit configured to change at least one the first and second input signals in response to the switch control signal; and
an enable circuit configured to count transitions of the switch control signal and generate an enable signal for application to control operation of the comparator circuit in response to a comparison of the counted transitions to a count threshold.

* * * * *